United States Patent
Hung et al.

(10) Patent No.: US 9,312,576 B2
(45) Date of Patent: Apr. 12, 2016

(54) PORTABLE ELECTRONIC DEVICES CAPABLE OF OBTAINING CHARGING CURRENT VALUE OF CHARGER AND CHARGING METHOD THEREOF

(75) Inventors: Ching-Chung Hung, Taoyuan County (TW); Yu-Peng Lai, Taoyuan County (TW); Wei-Chih Chang, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 1042 days.

(21) Appl. No.: 13/397,203

(22) Filed: Feb. 15, 2012

(65) Prior Publication Data

US 2013/0207594 A1    Aug. 15, 2013

(51) Int. Cl.
*H02J 7/00* (2006.01)
*H01M 10/44* (2006.01)

(52) U.S. Cl.
CPC .............. *H01M 10/44* (2013.01); *H02J 7/007* (2013.01); *H02J 2007/0062* (2013.01)

(58) Field of Classification Search
CPC .. H01M 10/44; H02J 7/007; H02J 2007/0062
USPC ........................................................ 320/107
See application file for complete search history.

(56) References Cited

U.S. PATENT DOCUMENTS

| | | | | |
|---|---|---|---|---|
| 5,506,490 | A * | 4/1996 | DeMuro | 320/106 |
| 8,103,885 | B2 * | 1/2012 | Sawyers et al. | 713/300 |
| 8,237,414 | B1 * | 8/2012 | Li | H02J 7/0003 320/103 |
| 8,458,376 | B1 * | 6/2013 | Chen | G06F 1/266 710/15 |
| 2004/0075419 | A1 * | 4/2004 | Massey et al. | 320/117 |
| 2006/0080476 | A1 | 4/2006 | Wang et al. | |
| 2007/0273327 | A1 | 11/2007 | Daniel et al. | |
| 2008/0303486 | A1 | 12/2008 | Kao et al. | |
| 2009/0177900 | A1 * | 7/2009 | Sawyers et al. | 713/300 |
| 2009/0198841 | A1 | 8/2009 | Yoshida et al. | |
| 2010/0052620 | A1 | 3/2010 | Wong | |

(Continued)

FOREIGN PATENT DOCUMENTS

| | | |
|---|---|---|
| CN | 101383627 A | 3/2009 |
| CN | 101398459 A | 4/2009 |

(Continued)

OTHER PUBLICATIONS

Texas Instruments, SP2T Switch with Impedance Detection Micro-USB Switch to Supportt USB, UART, published on Sep. 2011, pp. 1-26.

*Primary Examiner* — Yalkew Fantu
*Assistant Examiner* — Manuel Hernandez
(74) *Attorney, Agent, or Firm* — Birch, Stewart, Kolasch & Birch, LLP

(57) ABSTRACT

A portable electronic device is provided. Connector includes the first and data pins. Processor includes input and output pins and detection pin coupled to the input pin. First resistor is coupled between the detection pin and first voltage. When the processor detects that the first and second pins of charger are coupled to the first and second data pins of the connector, the processor provides switching signal to the selector, so as to couple the first and second data pins of the connector to the input and output pins of the processor, respectively, and to provide second voltage different from the first voltage, to the second pin of the charger via the output pin. The processor obtains charging current value of the charger according to voltage of the detection pin. The charger includes second resistor coupled between the first and second pins.

15 Claims, 6 Drawing Sheets

(56) References Cited

U.S. PATENT DOCUMENTS

| | | |
|---|---|---|
| 2010/0070659 A1 | 3/2010 | Ma et al. |
| 2010/0164440 A1 | 7/2010 | Ikeda |
| 2010/0228893 A1 | 9/2010 | Hung et al. |
| 2011/0043162 A1 | 2/2011 | Lee et al. |
| 2011/0095722 A1* | 4/2011 | Chang .......................... 320/107 |
| 2011/0314201 A1 | 12/2011 | Su et al. |
| 2013/0113414 A1* | 5/2013 | Chen ..................... H02J 7/0052 320/107 |

FOREIGN PATENT DOCUMENTS

| | | |
|---|---|---|
| CN | 101674366 A | 3/2010 |
| CN | 102231543 A | 11/2011 |
| DE | 10114124 A1 | 9/2002 |

* cited by examiner

PORTABLE ELECTRONIC DEVICES CAPABLE OF OBTAINING CHARGING CURRENT VALUE OF CHARGER AND CHARGING METHOD THEREOF

BACKGROUND OF THE INVENTION

1. Field of the Invention

The invention relates to a portable electronic device, and more particularly to a charging method of a portable electronic device.

2. Description of the Related Art

In general, a portable electronic device, such as a smart phone, a tablet computer and so on, comprises a battery and a battery charging circuit, wherein various types of chargers may be employed to charge the battery of the portable electronic device via the battery charging circuit. For example, a charger supporting the Universal Serial Bus (USB) specification may generate and provide the output powers between 5V/0.5 A and 5V/5 A to charge a portable electronic device via a connector supporting USB specification. A conventional battery charging circuit of a portable electronic device limits a charging current provided by a charger to a fixed level, regardless of the type of the charger and the magnitude of the charging current that the charger provides.

Therefore, it is necessary to automatically distinguish the types of chargers and to enable related charging schemes according to the charging currents of chargers.

BRIEF SUMMARY OF THE INVENTION

Portable electronic devices and charging methods thereof are provided. An embodiment of a portable electronic device comprises a connector, a processor, a first resistor and a selector. The connector comprises a first data pin and a second data pin. The processor comprises: a first set of pins, receiving and transmitting a pair of differential signals conforming to the Universal Serial Bus (USB) specification; a second set of pins, comprising an input pin and an output pin; and a detection pin coupled to the input pin. The first resistor is coupled between the detection pin and a first voltage. The selector selectively couples the connector to the first or second set of pins of the processor according to a switching signal. When the processor detects that a first pin and a second pin of a charger are respectively coupled to the first and second data pins of the connector, the processor provides the switching signal to the selector, so as to couple the first and second data pins of the connector to the input and output pins of the second set of pins of the processor, respectively, and to provide a second voltage different from the first voltage, to the second pin of the charger via the output pin. The processor obtains a charging current value of the charger according to a voltage of the detection pin.

Furthermore, another embodiment of a portable electronic device comprises a connector, a processor and a selector. The connector comprises a first data pin and a second data pin. The processor comprises: a first set of pins, receiving and transmitting a pair of differential signals conforming to the Universal Serial Bus (USB) specification; and a second set of pins, comprising an input pin and an output pin. The selector selectively couples the connector to the first or second set of pins of the processor according to a switching signal. When the processor detects that a first pin and a second pin of a charger are respectively coupled to the first and second data pins of the connector, the processor provides the switching signal to the selector, so as to couple the first and second data pins of the connector to the input and output pins of the second set of pins of the processor, respectively. The processor provides a grounding signal to the second pin of the charger via the output pin of the second set of pins, and provides a supply voltage to the second pin of the charger via the output pin of the second set of pins after being delayed for a determined period of time. The processor obtains a charging current value of the charger according to an input signal of the input pin of the second set of pins.

Moreover, an embodiment of a charging method for a portable electronic device is provided, wherein the portable electronic device comprises a processor and a battery. The charging method comprises: when detecting that a first connector of a charger is connected to a second connector of the portable electronic device, providing a first signal to a first pin of the first connector of the charger by an output pin of the processor via the second connector; obtaining an input signal from a second pin of the first connector of the charger by an input pin of the processor via the second connector in response to the first signal; obtaining a charging current value of the charger according to the input signal; using a first power pin of the second connector to charge the battery when the charging current value is smaller than or equal to a specific current value; and using the first power pin and a second power pin of the second connector to charge the battery when the charging current value is larger than the specific current value. The processor obtains a capacitance of a common capacitor or a resistance of a first resistor coupled to the first and second pins of the first connector in the charger according to the input signal.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
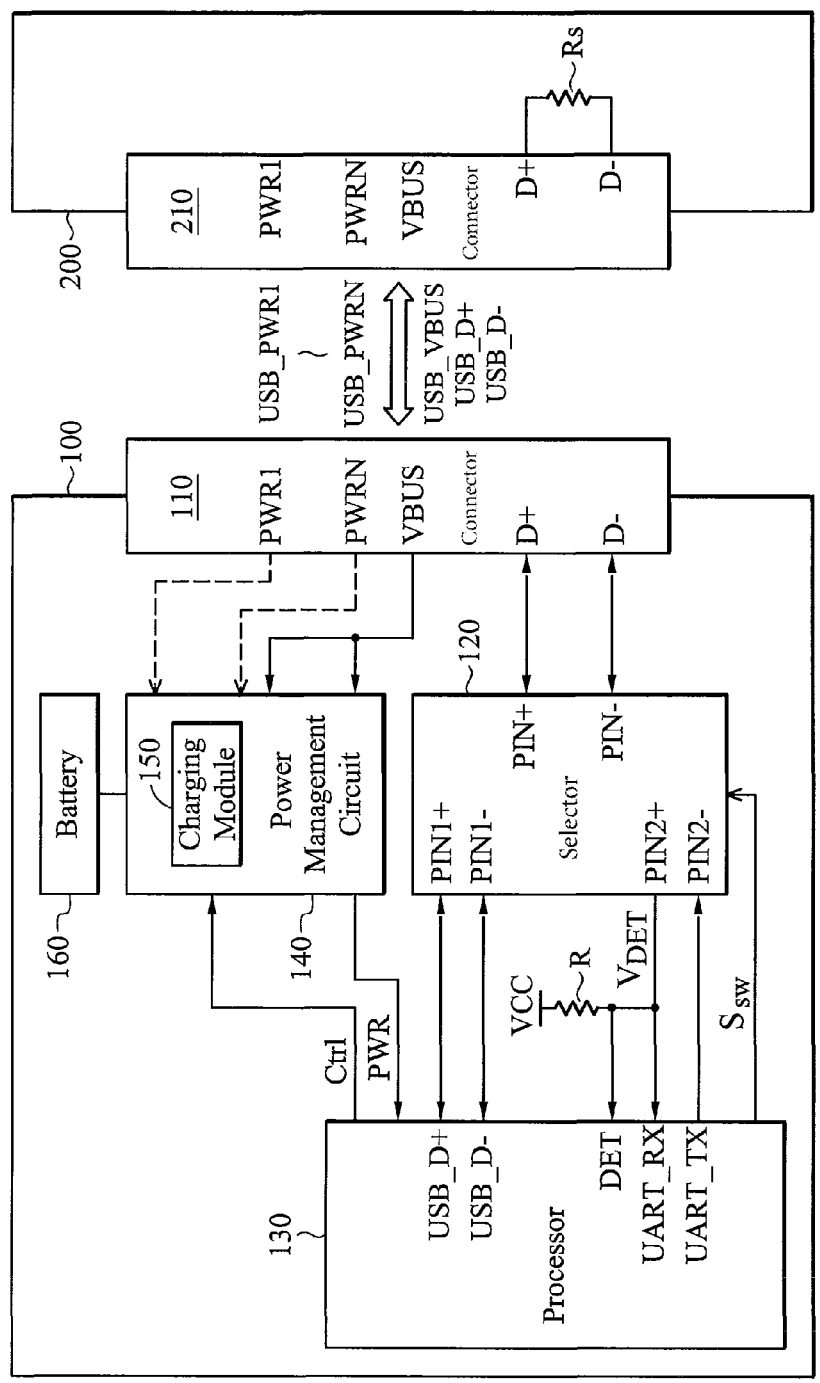
FIG. 1 shows a portable electronic device according to an embodiment of the invention.

FIG. 1 shows a portable electronic device 100 according to an embodiment of the invention. In FIG. 1, a charger 200 is used to charge a battery 160 of the portable electronic device 100 by coupling a connector 110 of the portable electronic device 100 to a connector 210 of the charger 200. In the embodiment, the charger 200 may be a power adapter or a wall charger. Furthermore, the connector 210 is coupled to the charger 200 via a cable. The portable electronic device 100 comprises the connector 110, a selector 120, a processor 130, a power management circuit 140 and the battery 160, wherein the power management circuit 140 comprises a charging module 150. The selector 120 is disposed between the connector 110 and the processor 130, wherein the pins PIN+ and PIN− are respectively coupled to the pins D+ and D− of the connector 110, the pins PIN1+ and PIN1− are respectively coupled to the pins USB_D+ and USB_D− of the processor 130, and the pins PIN2+ and PIN2− are respectively coupled to the pins UART_RX and UART_TX of the processor 130. The pins UART_RX and UART_TX are an input (receiver) pin and an output (transmitter) pin of universal asynchronous receiver/transmitter (UART), respectively. In one embodiment, the pins UART_RX and UART_TX may be a general purpose input/output (GPIO) pin configured in an input mode and another GPIO pin configured in an output mode, i.e. the pins UART_RX and UART_TX may be multi-purpose pins. Thus, the selector 120 selectively couples the pins D+ and D− of the connector 110 to the pins USB_D+ and USB_D− or the pins UART_RX and UART_TX of the processor 130 according to a switching signal $S_{SW}$ provided by the processor 130. The portable electronic device 100 further comprises a resistor R, wherein a terminal of the resistor R is coupled to a supply voltage VCC and another terminal of the resistor R is coupled to the pin PIN2+ of the selector 120 and the pin UART_RX and a detection pin DET of the processor 130. The connector 110 is compatible with a receptacle of Universal Serial Bus (USB) specification, wherein the connector 110 comprises the data pins D+ and D− and a power pin VBUS for transferring a pair of differential signals USB_D+ and USB_D− conforming to the USB specification and a power signal USB_VBUS, respectively. Furthermore, the charger 200 is compatible with a plug of USB specification, wherein the connector 210 of the charger 200 also comprises the pins D+ and D− and a power pin VBUS for transferring the pair of differential signals USB_D+ and USB_D− conforming to the USB specification and the power signal USB_VBUS, respectively. Moreover, the charger 200 further comprises a resistor Rs coupled between the pins D+ and D− of the connector 210, wherein a resistance of the resistor Rs does not exceed 200Ω. It is to be noted that the resistance of the resistor Rs corresponds to a power capability of the charger 200 (i.e. a charging current provided by the charger 200), as shown in the following Table 1.

TABLE 1

| Rs (ohm) | Power Capability (Ampere) |
|---|---|
| 0 | 1 |
| 100 | 2 |
| 150 | 3 |
| 180 | 5 |

In FIG. 1, when the connector 210 of the charger 200 is inserted into the connector 110 of the portable electronic device 100, the power management circuit 140 generates a signal PWR to the processor 130 according to a power signal USB_VBUS (i.e. 5 Volt voltage) from the charger 200, so as to notify the processor 130 that a device has connected to the portable electronic device 100 via the connector 110. The selector 120 is pre-set so that the pins D+ and D− of the connector 110 are coupled to the pins USB_D+ and USB_D− of the processor 130, thereby the processor 130 further determines whether the connected device is a USB device or a charger via the pins USB_D+ and USB_D−. For example, if the processor 130 can perform communications with the connected device, e.g. the data signals USB_D+ and USB_D− from the connected device are received via the pins USB_D+ and USB_D−, and the connected device is a USB device. On the contrary, if the processor 130 can not perform communications with the connected device, e.g. the pins USB_D+ and USB_D− can not receive the data signals USB_D+ and USB_D− from the connected device, and the connected device is a charger (i.e. the charger 200). Thus, the processor 130 may provide the switching signal $S_{SW}$ to the selector 120, so as to couple the pins D+ and D− of the connector 110 to the pins UART_RX and UART_TX of the processor 130. Next, the processor 130 provides a low level signal LOW (e.g. a grounding signal) to the pin D− of the charger 200 via the pin UART_TX. Next, the processor 130 detects a voltage division $V_{DET}$ of the resistors R and Rs via the detection pin DET, and obtains the resistance of the resistor Rs according to a voltage level of the voltage division $V_{DET}$. In the embodiment, the processor 130 uses an analog to digital converter to obtain the voltage level of the voltage division $V_{DET}$. Thus, the processor 130 obtains the magnitude of a charging current $I_{charge}$ of the charger 200 according to the resistance of the resistor Rs. Next, according to the charging current $I_{charge}$, the processor 130 may provides a control signal Ctrl to the charging module 150, so as to enable a charging circuit of the charging module 150 corresponding to the charging current $I_{charge}$. Thus, the charging circuit 150 charges the battery 160 according to the power signal USB_VBUS of the power pin VBUS from the charger 200. The connector 210 of the charger 200 and the connector 110 of the portable electronic device 100 may be the micro USB connectors or mini USB connectors. In addition, the connector 210 of the charger 200 may be a customization connector supporting the USB specification.

Furthermore, when the charging current $I_{charge}$ is a large current, the connector 210 of the charger 200 and the connector 110 of the portable electronic device 100 further use the other power pins except the power pin VBUS, to charger the battery 160. For example, when the processor 130 provides the control signal Ctrl to indicate that the detected charging current $I_{charge}$ is a large current, the charging module 150 may charge the battery 160 according to the power signal USB_VBUS of the power pin VBUS and the power signals USB_PWR1-USB_PWRN (e.g. 5 volt voltage) of the power pins PWR1-PWRN, wherein the charging module 150 may adjust the amount of the power pins PWR1-PWRN that are required. In one embodiment, the pads of the power pins PWR1-PWRN are larger than a pad of the power pin VBUS. In other words, when detecting that the charging current $I_{charge}$ of the charger 200 is a large current, the portable electronic device 100 may use more power pins to receive the charging current from the charger 200, so as to charge the battery 160. For example, the connector 110 of the portable electronic device 100 comprises a base body having an opening, a first tongue and a second tongue, wherein the pins D+ and D− and the power pin VBUS of the connector 110 are disposed in the first tongue, and the power pins PWR1-PWRN are disposed in the second tongue. Furthermore, the first tongue is compatible with a plug of USB specification.

In one embodiment, a terminal of the resistor R of the portable electronic device 100 is coupled to a ground GND, and another terminal of the resistor R is coupled to the pin PIN2+ of the selector 120 and the pin UART_RX and a detection pin DET of the processor 130. Therefore, when the selector 120 couples the pins D+ and D− of the connector 110 to the pins UART_RX and UART_TX of the processor 130, the processor 130 provides a high level signal HIGH (e.g. a supply voltage) to the pin D− of the charger 200 via the pin UART_TX, such that the processor 130 may detect the voltage division $V_{DET}$ between the resistors R and Rs via the detection pin DET, to obtain the charging current $I_{charge}$ of the charger 200. Similarly, the processor 130 provides the control signal Ctrl to the charging module 150 according to the charging current $I_{charge}$, so as to enable a charging circuit of the charging module 150 corresponding to the charging current $I_{charge}$ for charging the battery 160.

Figure 2A:
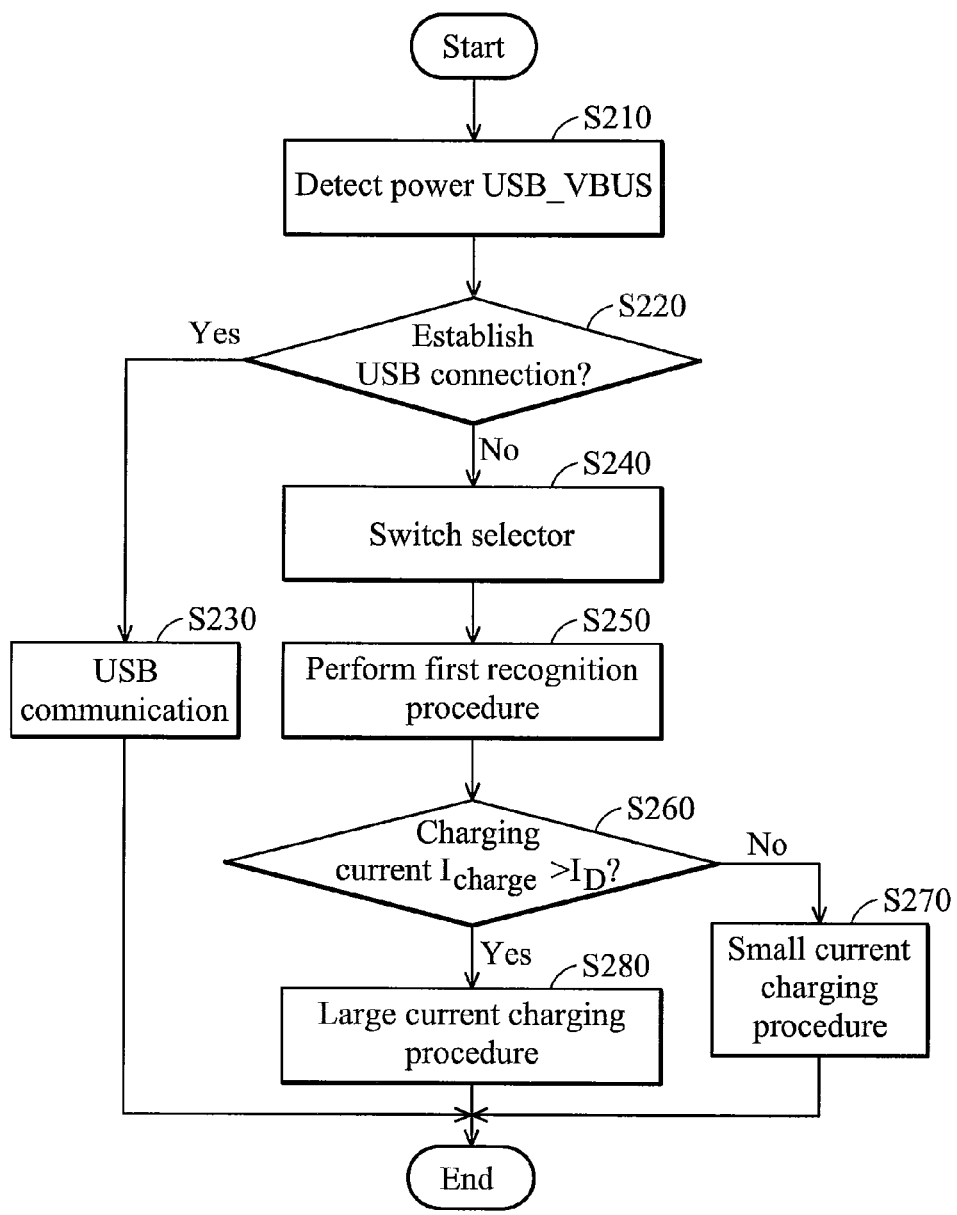
FIG. 2A shows a charging method for the portable electronic device of FIG. 1 according to an embodiment of the invention.

FIG. 2A shows a charging method for the portable electronic device 100 of FIG. 1 according to an embodiment of the invention. Referring to FIG. 1 and FIG. 2A together, when an external power signal USB_VBUS is detected, the power management circuit 140 generates a signal PWR to notify the processor 130 that a device has connected to the portable electronic device 100 via the connector 110 (step S210). Next, the processor 130 determines whether the portable electronic device 100 may establish a USB connection with the device (step S220). If the device is a USB device (e.g. a computer), the portable electronic device 100 can establish the USB connection with the device, such that the processor 130 may perform data access with the USB device via the selector 120 (step S230), and the USB device simultaneously uses the charging current $I_{charge}$ having 0.5 A to charge the portable electronic device 100. If the device is a charger (i.e. the charger 200), the portable electronic device 100 can not establish the USB connection with the device. Thus, the processor 130 provides the switching signal $S_{SW}$ to switch the selector 120 (step S240), so as to couple the pins D+ and D− of the connector 110 to the pins UART_RX and UART_TX of the processor 130. Next, the processor 130 may perform a first recognition procedure to obtain the magnitude of the charging current $I_{charge}$ of the charger 200 (step S250). Next, the processor 130 determines whether the charging current $I_{charge}$ exceeds a specific current value $I_D$ (step S260). If no, the processor 130 controls the charging module 150 to perform a small current charging procedure (step S270), i.e. only the power signal USB_VBUS form the charger 200 is used to charge the battery 160. If the charging current $I_{charge}$ exceeds the specific current value $I_D$, the processor 130 controls the charging module 150 to perform a large current charging procedure (step S280), i.e. the power signal USB_VBUS and the plurality of power signals USB_PWR1-USB_PWRN from the charger 200 are used to charge the battery 160.

Figure 2B:
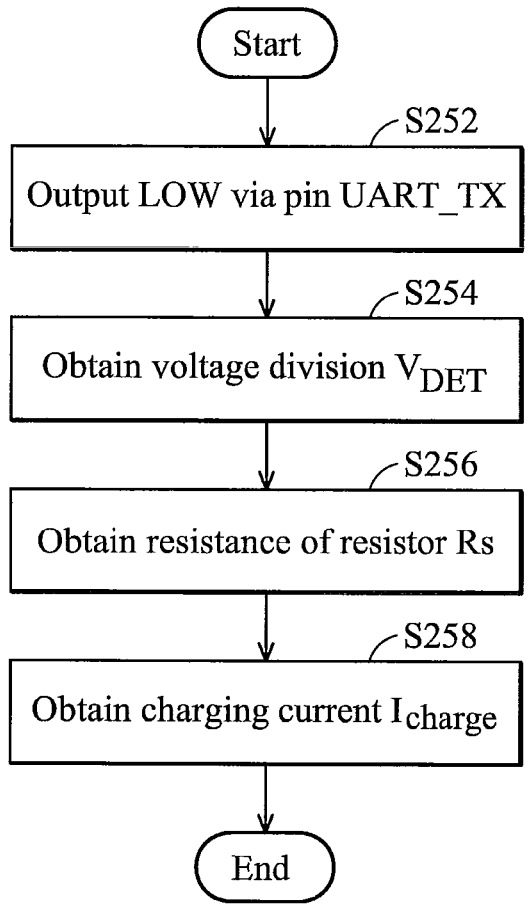
FIG. 2B shows a flowchart illustrating the performance of the first recognition procedure of FIG. 2A.

FIG. 2B shows a flowchart illustrating the performance of the first recognition procedure (step S250) of FIG. 2A. Referring to FIG. 1 and FIG. 2B together, in step S252, the processor 130 provide a low level signal LOW to the pin D− of the charger 200 via the pin UART_TX. Next, the processor 130 obtains the voltage division $V_{DET}$ between the resistors R and Rs via the detection pin DET (step S254), and obtains the resistance of the resistor Rs according to the voltage division $V_{DET}$ and Table 1 (step S256). Next, the processor 130 obtains the charging current $I_{charge}$ of the charger 200 (step S258).

Figure 3:
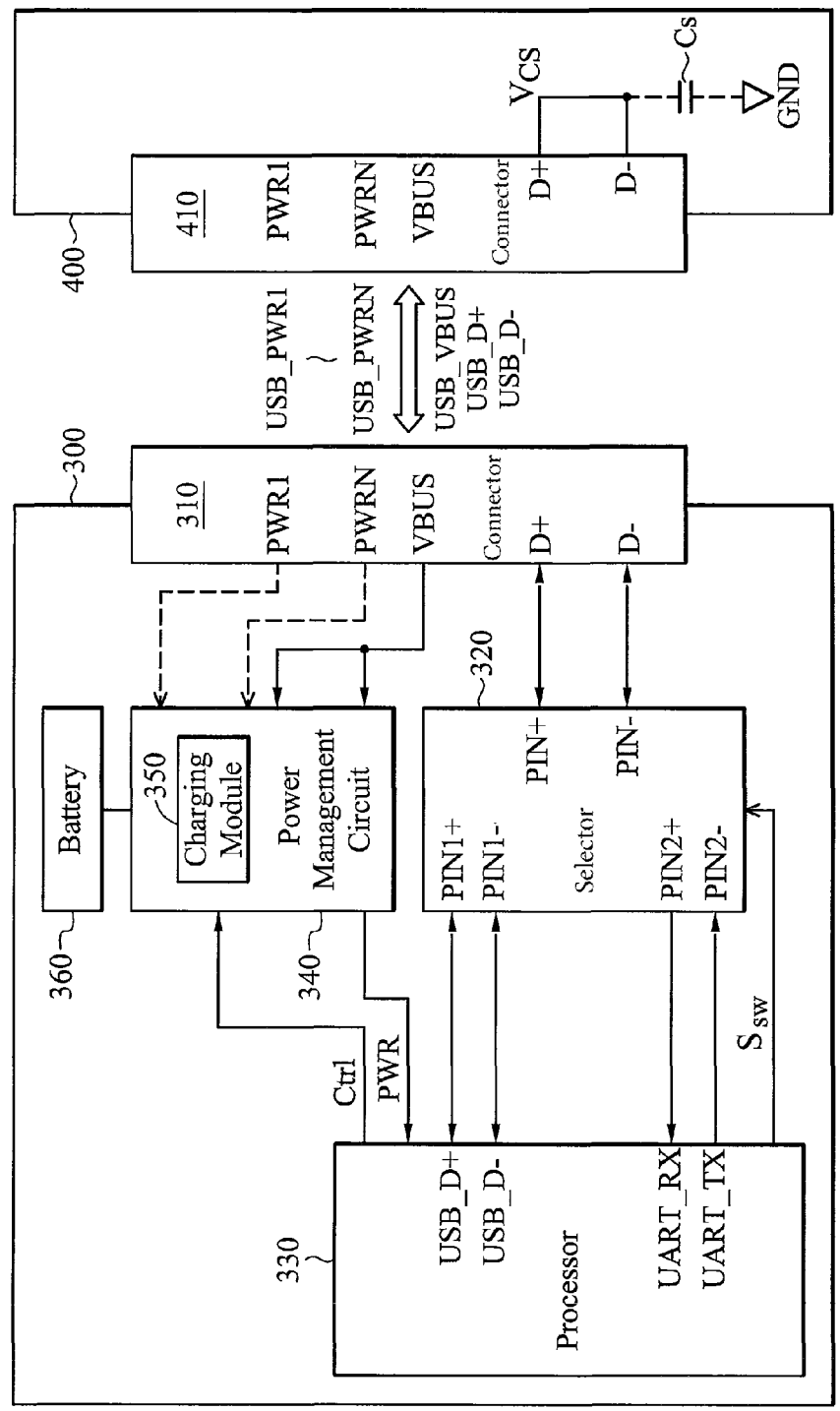
FIG. 3 shows a portable electronic device according to another embodiment of the invention.

FIG. 3 shows a portable electronic device 300 according to another embodiment of the invention. In FIG. 3, a charger 400 is used to charge a battery 360 of the portable electronic device 300 by coupling a connector 310 of the portable electronic device 300 to a connector 410 of the charger 400. Compared to the charger 200 of FIG. 1, no resistor Rs is coupled between the pins D+ and D− of the connector 410 for the charger 400. In the charger 400, the pins D+ and D− of the connector 410 are shorted. Furthermore, in a portion of embodiments, the pins D+ and D− of the connector 410 are also coupled to the ground GND via a capacitor Cs. It is to be noted that a capacitance of the capacitor Cs corresponds to a power capability of the charger 400 (i.e. a charging current provided by the charger 400), as shown in following Table 2.

TABLE 2

| Cs (micro farad) | Power Capability (Ampere) |
| --- | --- |
| No connection | 1 |
| 0.1 | 2 |
| 1 | 3 |
| 10 | 5 |

When the connector 410 of the charger 400 is inserted into the connector 310 of the portable electronic device 300, the power management circuit 340 generates a signal PWR to the processor 330 according to a power signal USB_VBUS from the charger 400, so as to notify the processor 330 that a device has connected to the portable electronic device 300 via the connector 310. The selector 320 is pre-set so that the pins D+ and D− of the connector 310 are coupled to the pins USB_D+ and USB_D− of the processor 330. As described above, the processor 330 may determine whether the connected device is a USB device or a charger via the pins USB_D+ and USB_D−. In the embodiment, due to the processor 330 not being able to perform communications with the connected device, the processor 330 determines that the connected device is a charger (i.e. the charger 400), and provides a switching signal $S_{SW}$ to the selector 320, so as to couple the pins D+ and D− of the connector 310 to the pins UART_RX and UART_TX of the processor 330. Next, the processor 330 provides a low level signal LOW (e.g. a grounding signal) to the pin D− of the charger 400 via the pin UART_TX, so as to discharge the capacitor Cs. Next, after delaying for a predetermined period of time (i.e. the capacitor Cs has been discharged completely), the processor 330 provides a high level signal HIGH (e.g. a supply voltage) to the pin D− of the charger 400 via the pin UART_TX, so as to charge the capacitor Cs. Next, the processor 330 cyclically performs sampling via the pin UART_RX, so as to detect a variation of a voltage $V_{Cs}$ of the charger 400. In the embodiment, if the capacitor Cs has a larger capacitance, a charging time is also longer for the capacitor Cs, so the processor 330 may detect that a rising speed of the voltage $V_{Cs}$ is slow. Next, according to the variation of a voltage $V_{Cs}$, the processor 330 obtains a capacitance of the capacitor Cs. Thus, by looking up Table 2, the processor 330 may obtain the magnitude of a charging current $I_{charge}$ of the charger 400. For example, if the four sampled signals are (1, 1, 1, 1) that are sampled via the pin UART_RX, the processor 330 may determine that no capacitor Cs is coupled between the pins D+ and D− of the charger 400, thus the processor 330 obtains that the charging current $I_{charge}$ of the charger 400 is 1 A according to Table 2. If the four sampled signals are (0, 1, 1, 1) that are sampled via the pin UART_RX, the processor 330 may determine that the capacitance of the capacitor Cs is 0.1 µF, thus the processor 330 obtains that the charging current $I_{charge}$ of the charger 400 is 2 A according to Table 2. If the four sampled signals are (0, 0, 1, 1) which are sampled via the pin UART_RX, the processor 330 may determine that the capacitance of the capacitor Cs is 1 µF, thus the processor 330 obtains that the charging current $I_{charge}$ of the charger 400 is 3 A according to Table 2. If the four sampled signals are (0, 0, 0, 1) which are sampled via the pin UART_RX, the processor 330 may determine that the capacitance of the capacitor Cs is 10 µF, thus the processor 330 obtains that the charging current $I_{charge}$ of the charger 400 is 5 A according to Table 2. As described above, according to the charging current $I_{charge}$, the processor 330 provides the control signal Ctrl to the charging module 350, so as to enable a charging circuit of the charging module 350 corresponding to the charging current $I_{charge}$. Next, the charging module 350 may perform a large current charging procedure or a small current charging procedure according to the charging current $I_{charge}$.

Figure 4A:
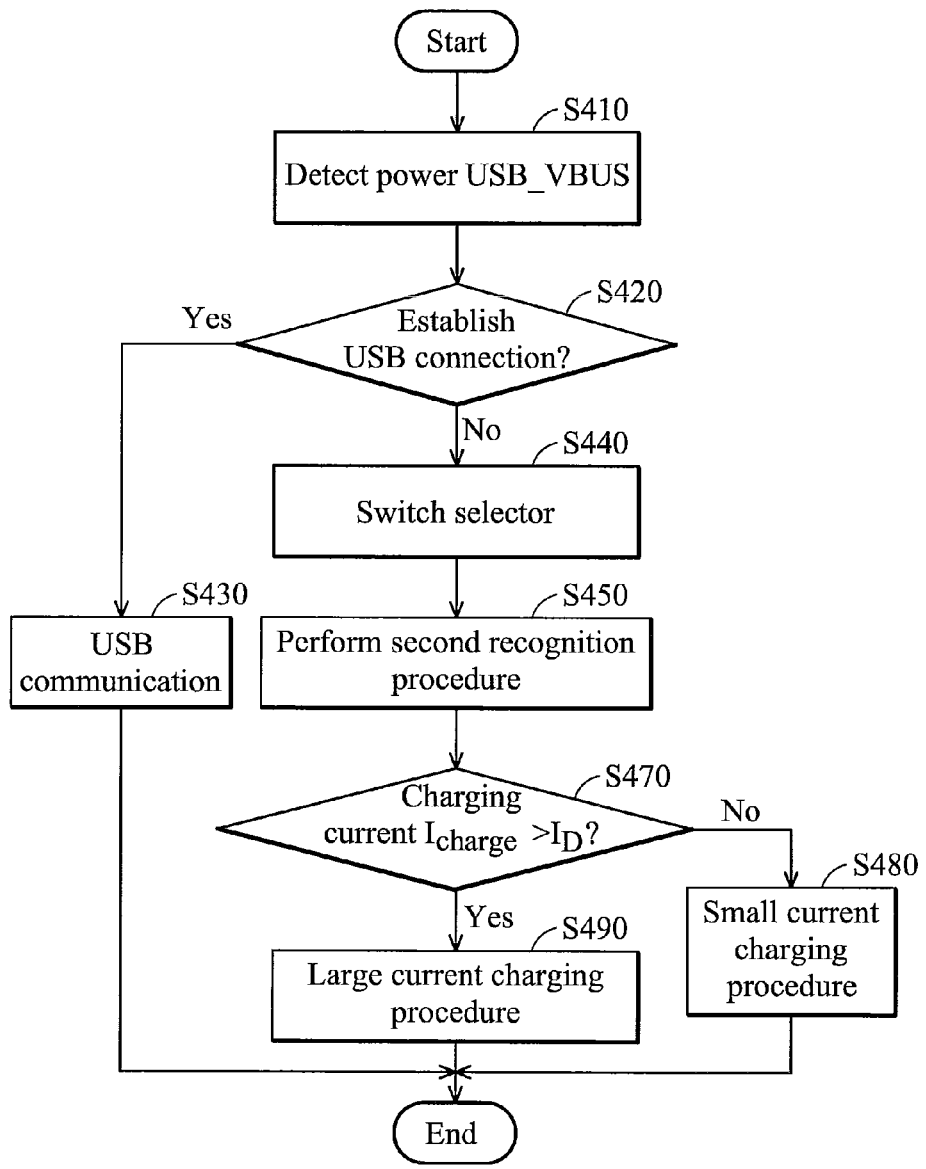
FIG. 4A shows a charging method for the portable electronic device of FIG. 3 according to another embodiment of the invention.

FIG. 4A shows a charging method for the portable electronic device 300 of FIG. 3 according to another embodiment of the invention. Referring to FIG. 3 and FIG. 4A together, when an external power signal USB_VBUS is detected, the power management circuit 340 generates a signal PWR to notify the processor 330 that a device has connected to the portable electronic device 300 via the connector 310 (step S410). Next, the processor 330 determines whether the portable electronic device 300 may establish a USB connection with the device (step S420). If the device is a USB device, the portable electronic device 300 can establish the USB connection with the device, such that the processor 330 may perform data access with the USB device via the selector 320 (step S430), and the USB device simultaneously uses the charging current $I_{charge}$ having 0.5 A to charge the portable electronic device 300. If the device is a charger (i.e. the charger 400), the portable electronic device 300 can not establish the USB connection with the device. Thus, the processor 330 provides the switching signal $S_{SW}$ to switch the selector 320 (step S440), so as to couple the pins D+ and D− of the connector 310 to the pins UART_RX and UART_TX of the processor 330. Next, the processor 330 may perform a second recognition procedure to obtain the magnitude of the charging current $I_{charge}$ of the charger 400 (step S450). Next, the processor 330 determines whether the charging current $I_{charge}$ exceeds a specific current value $I_D$ (step S470). If no, the processor 330 controls the charging module 350 to perform a small current charging procedure (step S480), i.e. only the power signal USB_VBUS form the charger 400 is used to charge the battery 360. If the charging current $I_{charge}$ exceeds the specific current value $I_D$, the processor 330 controls the charging module 350 to perform a large current charging procedure (step S490), i.e. the power signal USB_VBUS and the plurality of power signals USB_PWR1-USB_PWRN from the charger 400 are used to charge the battery 360.

Figure 4B:
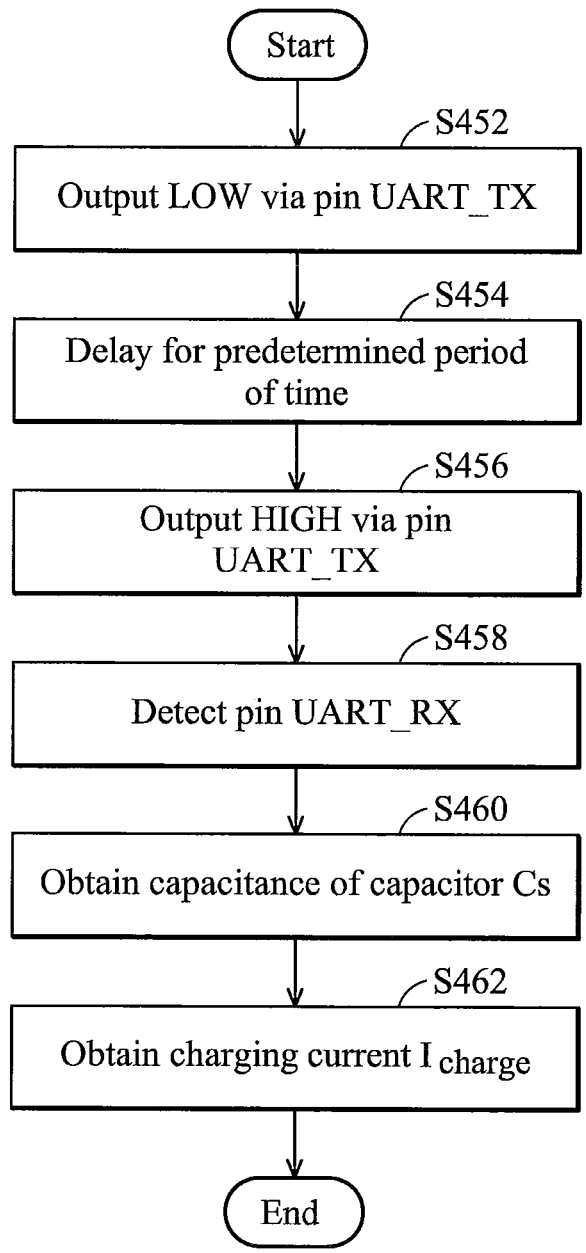
FIG. 4B shows a flowchart illustrating the performance of the second recognition procedure of FIG. 4A.

FIG. 4B shows a flowchart illustrating the performance of the second recognition procedure (step S450) of FIG. 4A. Referring to FIG. 3 and FIG. 4B together, in step S452, the processor 330 provides a low level signal LOW to the pin D− of the charger 400 via the pin UART_TX. Next, after delaying for a predetermined period of time (step S454), the processor 330 provides a high level signal HIGH to the pin D− of the charger 400 via the pin UART_TX (step S456). In step S458, the processor 330 detects a voltage variation of the capacitor Cs via the pin UART_RX, so as to obtain the capacitance of the capacitor Cs (step S460). Next, according the capacitance of the capacitor Cs and Table 2, the processor 330 obtains the charging current $I_{charge}$ of the charger 400 (step S462).

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A charging method for a portable electronic device, wherein the portable electronic device comprises a processor and a battery, comprising:

when detecting that a first connector of a charger is connected to a second connector of the portable electronic device, providing a first signal to a first pin of the first connector of the charger by an output pin of the processor via the second connector;

obtaining an input signal from a second pin of the first connector of the charger by an input pin of the processor via the second connector in response to the first signal;

obtaining a charging current value of the charger according to the input signal;

comparing the charging current value of the charger to a specific current value;

using a first power supply pin of the second connector to charge the battery when the charging current value is smaller than or equal to the specific current value; and using the first power supply pin and at least one second power supply pin of the second connector to charge the battery when the charging current value is larger than the specific current value, wherein when the charging current value is larger than the specific current value, each of the first power supply pin and the at least one second power supply pin is directly connected to power pins of the charger for receiving charging current from the charger and supplying the received charging current to the battery, and wherein the processor obtains a resistance of a first resistor coupled to the first and second pins of the first connector in the charger according to the input signal.

2. The charging method as claimed in claim 1, wherein the first and the second data pins of the first connector are compatible with a USB_D+ pin and a USB_D− pin of USB specification.

3. The charging method as claimed in claim 1, wherein the portable electronic device further comprises a second resistor coupled between a determined voltage and the input pin of the processor, wherein the a voltage level of the first signal is different from the determined voltage, and the first resistor is coupled between the first and second pins of the first connector of the charger.

4. The charging method as claimed in claim 1, wherein a pad area of the second power pin is larger than a pad area of the first power pin, and the first power pin is compatible with a VBUS pin of USB specification.

5. The charging method as claimed in claim 1, wherein the at least one second power supply pin further comprises a plurality of power supply sub-pins, and the processor determines the amount of the plurality of power supply sub-pins of the at least one second power supply pin according to the charging current value of the charger.

6. A portable electronic device, comprising:

a connector, comprising a first data pin and a second data pin;

a processor, comprising:

a first set of pins, receiving and transmitting a pair of differential signals conforming to Universal Serial Bus (USB) specification;

a second set of pins, comprising an input pin and an output pin; and a detection pin coupled to the input pin;

a first resistor coupled between the detection pin and a first voltage; and a selector, selectively coupling the connector to the first or second set of pins of the processor according to a switching signal, wherein when the processor detects that a first pin and a second pin of a charger are respectively coupled to the first and second data pins of the connector, the processor provides the switching signal to the selector, so as to couple the first data pin of the connector to the input pin of the second set of pins and the detection pin of the processor and to couple the second data pin of the connector to the output pin of the second set of pins of the processor, and to provide a second voltage different from the first voltage, to the second pin of the charger via the output pin, wherein when the first data pin of the connector is coupled to the input pin of the second set of pins and the detection pin of the processor, and the second data pin of the connector is coupled to the output pin of the second set of pins of the processor, and when the second pin of the charger is provided with the second voltage via the output pin of the processor, the processor obtains a resistance of a resistor coupled between the first pin and the second pin of the charger that corresponds to a power capability of the charger according to a voltage of the detection pin, and then obtains a charging current value of the charger according to the obtained resistance of the resistor of the charger.

7. The portable electronic device as claimed in claim 6, wherein the first and the second data pins of the connector are compatible with a USB_D+ pin and a USB_D− pin of USB specification.

8. The portable electronic device as claimed in claim 7, wherein when the processor detects that a USB_D+ pin and a USB_D− pin of a USB device are coupled to the first and second data pins of the connector, respectively, the processor performs USB communications with the USB device via the first set of the pins.

9. The portable electronic device as claimed in claim 6, wherein the charger comprises a second resistor coupled between the first and second pins, and the processor obtains a resistance of the second resistor according to a voltage division of the first and second resistors, wherein the resistance of the second resistor corresponds to the charging current value of the charger.

10. The portable electronic device as claimed in claim 6, wherein the connector further comprises a first power pin and at least one second power pin, wherein the first power pin is compatible with a VBUS pin of USB specification.

11. The portable electronic device as claimed in claim 6, further comprising:

a power management circuit coupled to the first and second power pins, wherein when the charging current value of the charger is larger than a specific current value, the power management circuit receives a charging current of the charger via the second power pin.

12. The portable electronic device as claimed in claim 10, wherein the at least one second power pin further comprises a plurality of power sub-pins, and the processor determines the amount of the plurality of power sub-pins of the at least one second power pin according to the charging current value of the charger.

13. The portable electronic device as claimed in claim 11, wherein a pad area of the second power pin is larger than a pad area of the first power pin.

14. The portable electronic device as claimed in claim 10, wherein the connector comprises: a base body, having an opening; a first tongue, having the first data pin, the second data pin and the first power pin, wherein the first tongue is compatible with a plug of USB specification; and a second tongue, having the second power pin.

15. The portable electronic device as claimed in claim 6, wherein the second set of pins are universal asynchronous receiver/transmitter (UART) pins or Multi-purpose pins.

* * * * *